United States Patent [19]
Drucker et al.

[11] Patent Number: 5,736,987
[45] Date of Patent: Apr. 7, 1998

[54] COMPRESSION OF GRAPHIC DATA NORMALS

[75] Inventors: Steven M. Drucker, Bellevue; Donald P. Mitchell, Redmond, both of Wash.

[73] Assignee: Microsoft Corporation, Redmond, Wash.

[21] Appl. No.: 618,194

[22] Filed: Mar. 19, 1996

[51] Int. Cl.$^6$ .................................................. G06T 15/00
[52] U.S. Cl. ...................... 345/420; 345/418; 345/202;
364/715.02; 382/232; 382/242; 395/888
[58] Field of Search ........................ 345/202, 418–9,
345/430–31, 429, 501–3, 420; 395/888;
382/232, 242; 364/715.02

[56] References Cited

U.S. PATENT DOCUMENTS

| | | | |
|---|---|---|---|
| 5,216,726 | 6/1993 | Heaton | 382/56 |
| 5,296,235 | 3/1994 | Newman | 395/133 |
| 5,440,682 | 8/1995 | Deering | 395/162 |

OTHER PUBLICATIONS

Durkin, et al, "Nonpolygonal Isosurface Rendering for Large Volume Datasets", Proceedings '94, IEEE, pp. 293–300.

Durkin, John, "Compressing the X Graphics Protocol", Dissertation, Princeton University Department of Computer Science, pp. 1–128, Nov. 1994.

*Primary Examiner*—Joseph H. Feild
*Assistant Examiner*—Rudolph J. Buchel
*Attorney, Agent, or Firm*—Ronald M. Anderson

[57] ABSTRACT

Geometric data for a three-dimensional surface are compressed in regard to the data representing the continuity between triangles in a mesh that represents the three-dimensional surface. The geometric data include information defining the vertices of the triangles comprising the mesh, an indication of the triangle faces, and corner normals to each of the vertices shared by triangles having a common vertex, which indicates the continuity or discontinuity between adjacent triangles of the surface. Vertex rotation continuity (VRC) data are determined for each vertex shared by adjacent triangles, indicating whether the transition between the adjacent triangles is continuous or discontinuous. Further, a dihedral angle between each pair of adjacent triangles is determined and associated with the VRC bit. The VRC data are sorted by the associated dihedral angles, enabling an optimal dihedral angle to be selected. The optimal dihedral angle is chosen so as to minimize the number of errors in predicting the nature of the transition between adjacent triangles based on the dihedral angle between the adjacent triangle. Next, exception data are generated by comparing the dihedral angle for each pair of adjacent triangles to the optimal dihedral angle to predict a VRC bit, and noting any errors within the exception data. The exception data are encoded to further reduce the size of the compressed data used to represent the three-dimensional surface. The compressed data require less space for storage and are more efficiently transmitted to a remote site.

26 Claims, 4 Drawing Sheets

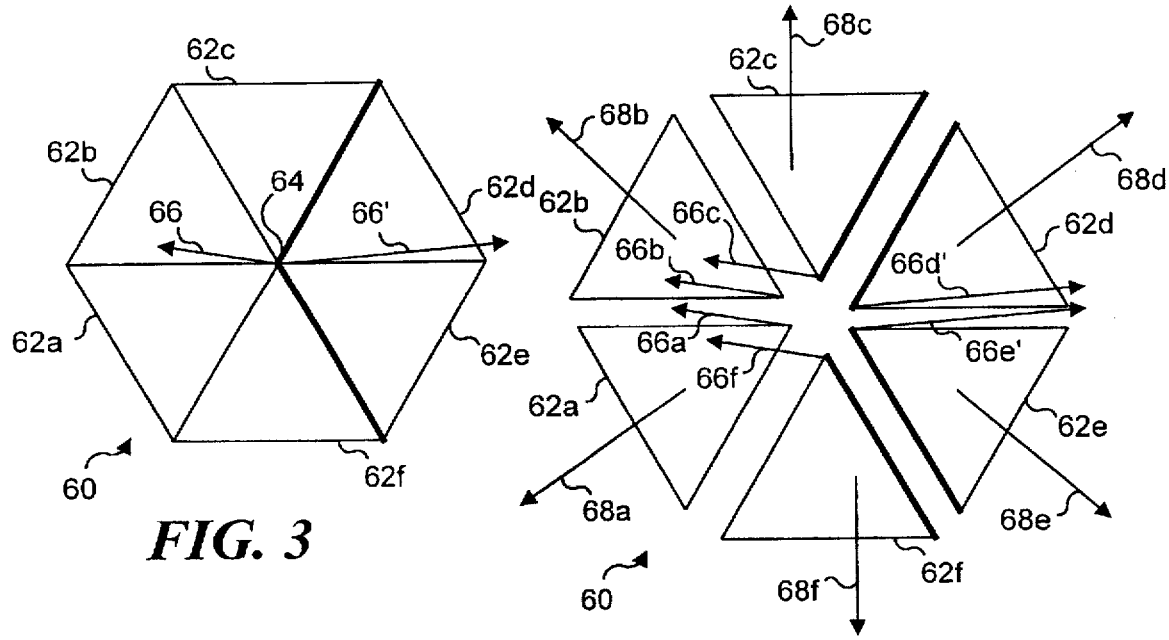
*FIG. 3*
*FIG. 4*
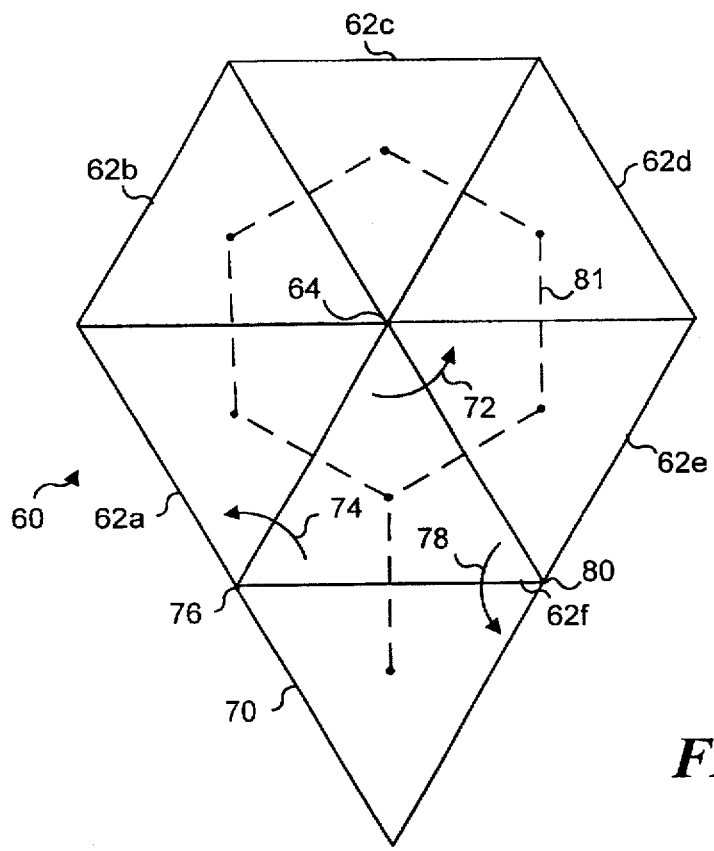
*FIG. 5*

5,736,987

COMPRESSION OF GRAPHIC DATA NORMALS

FIELD OF THE INVENTION

The present invention generally relates to the compression of graphic data, and more specifically, to compression of graphic data defining a three-dimensional surface, where the graphic data include information defining the continuity (i.e., smoothness) of the surface.

BACKGROUND OF THE INVENTION

Rendered three-dimensional graphic representations of objects are increasingly used in applications intended to run on conventional personal computers. Although substantial time may be required to produce the geometric data representing three-dimensional objects, the geometric data are then readily usable for displaying the three-dimensional objects with appropriate lighting, texture, and shading. The ever improving speed and processing capabilities of personal computers, resulting from the use of more powerful central processing units (CPUs) and more powerful graphics video driver hardware, have enabled the real-time rendering of three-dimensional graphic objects to be readily implemented in application programs. However, there are still limitations on the use of three-dimensional graphic representations in such programs. For example, even modems operating at 28.8 Kbps can require considerable time to transfer geometric data from a server over a telephone network to display three-dimensional graphic objects on the monitor of a client computer. Complex three-dimensional graphic representations can also require considerable storage space on a hard drive, limiting the amount of such data that the average computer user can store, as a practical matter.

For almost any three-dimensional graphical application, manipulation of the geometric data is a fundamental component. While other representations can be used, these geometric data typically represent a surface as a mesh of connected triangles. Often, a relatively large quantity of geometric data are required to define a surface in regard to such a mesh of triangles in terms of the three-dimensional coordinates of the triangle vertices, normal vectors, texture coordinates, and material properties of the surface. When the geometric data defining a three-dimensional graphic object must be stored or transmitted from one site to another, there is typically a substantial penalty in the storage and the transmission time required, due to the amount of the data. Accordingly, it would be desirable to compress the geometric data to produce compressed data that can be more efficiently stored and/or transmitted to another location.

The present invention addresses this problem by compressing the portion of the graphical data that defines the continuity between the triangles of a mesh that represents the surface of an object. It is likely that other portions of the geometric data may be compressed using techniques that are outside the scope of the present invention, yielding even further reduction in the storage space and transmission time required for the data.

SUMMARY OF THE INVENTION

In accordance with the present invention, a method is disclosed for compressing geometric data that represent a surface as a plurality of connected triangles arranged in a mesh. The geometric data include coordinates for vertices of each triangle in the mesh, an index of the triangles, and normals to corners of the triangles. The method includes the step of loading the geometric data into a computer memory to enable processing of the geometric data to determine vertex rotation continuity (VRC) data for the vertices of each triangle. The VRC indicate whether the transition between adjacent triangles of the mesh that share a common vertex is continuous. A dihedral angle between each pair of adjacent triangles is determined, and an optimum dihedral angle is selected for use in predicting whether a surface transition between adjacent triangles is continuous or discontinuous. A discontinuous transition occurs where the surface representation exhibits an abrupt change in direction at the line between the two adjacent triangles. Corner normal predictions that predict surface continuity as a function of the dihedral angle between each pair of adjacent triangles and the optimum dihedral angle are then generated. Exception data are determined, the exception data indicating triangle corners for which the corner normal predictions are incorrect. Compressed data defining the surface are then produced. The compressed data include the vertices of the triangles comprising the mesh, the optimum dihedral angle, and the exception data. The compressed data are substantially smaller in quantity than the geometric data.

The step of determining the VRC data comprises the step of determining if the normals to the corners of the triangles comprising each pair of adjacent triangles in the mesh are identical, indicating a surface continuity between the pair of adjacent triangles, or not identical, indicating a surface discontinuity between the pair of adjacent triangles. The VRC data preferably comprise a binary bit for each of the corners of the triangles comprising the pairs of adjacent triangles. The binary bit comprising the VRC data for a corner of a triangle is associated with the dihedral angle between the pair of adjacent triangles that share a common vertex at the corner.

The step of choosing the optimum dihedral angle comprises the step of sorting the VRC data by the associated dihedral angles between each of the pairs of adjacent triangles. The optimum dihedral angle is then selected so as to minimize the number of corner normal predictions that are incorrect.

Further, the step of determining the exception data from corner normal predictions comprises the step of comparing the corner normal predictions to actual corner normals. If the corner normal prediction for a corner is not identical to the actual corner normal, an exception is noted in the exception data. The method also comprises the step of encoding the exception data to further reduce the size of the compressed data.

Another aspect of the present invention is directed to a system for compressing the geometric data. The system includes a display for displaying the geometric data as a rendered surface, and a memory for storing machine instructions comprising a software program. A CPU executes the machine instructions stored in the memory. The machine instructions effect a plurality of functions that compress the geometric data to produce compressed data for use in rendering the surface on the display. The plurality of functions implemented by the CPU in accord with the machine instructions are generally consistent with the steps of the method discussed above.

Yet a further aspect of the invention is directed to an article of manufacture for use in controlling a processor of a computer. The article of manufacture comprises a memory medium on which a plurality of machine instructions are stored. When the machine instructions are executed by the processor, they cause it to implement functions to compress the geometric data that are generally consistent with the functions of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 3 illustrates a portion of a mesh of adjacent triangles that represent a three-dimensional surface, where the triangles are centered around a common vertex;

FIG. 4 illustrates the triangles comprising the portion of the mesh shown in FIG. 3 in an exploded view;

FIG. 5 illustrates how VRC data are determined for a triangle that is part of a portion of a mesh representing a three-dimensional surface;

DESCRIPTION OF THE PREFERRED EMBODIMENT

Figure 1:
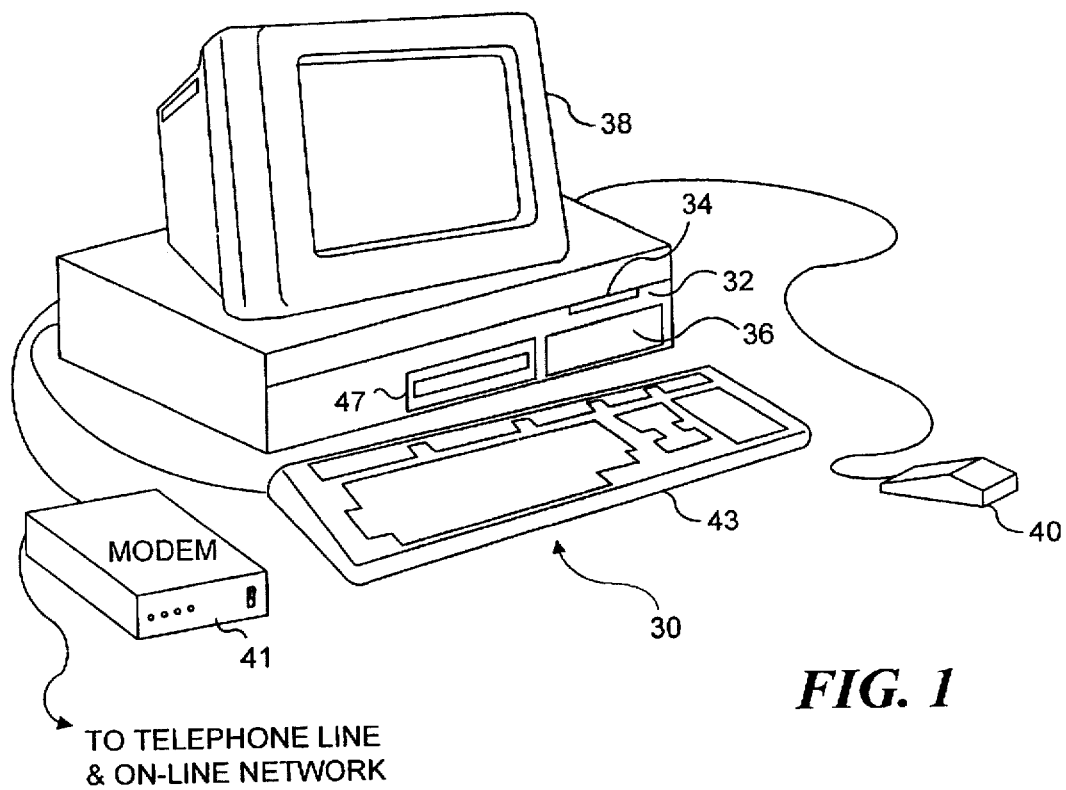
FIG. 1 is an isometric view of a computer system suitable for practicing the present invention.

With reference to FIG. 1, a generally conventional personal computer 30 is illustrated, which is suitable for use in connection with practicing the present invention. Personal computer 30 includes a processor chassis 32 in which are mounted a floppy disk drive 34, a hard drive 36, a motherboard populated with appropriate integrated circuits (not shown), and a power supply (also not shown), as are generally well known to those of ordinary skill in the art. A monitor 38 is included for displaying graphics and text generated by software programs that are run by the personal computer. A mouse 40 (or other pointing device) is connected to a serial port (or to a bus port) on the rear of processor chassis 32, and signals from mouse 40 are conveyed to the motherboard to control a cursor on the display and to select text, menu options, and graphic components displayed on monitor 38 by software programs executing on the personal computer. In addition, a keyboard 43 is coupled to the motherboard for user entry of text and commands that affect the running of software programs executing on the personal computer.

Personal computer 30 also optionally includes a compact disk-read only memory (CD-ROM) into which a CD-ROM disk may be inserted so that executable files and data on the disk can be read for transfer into the memory and/or into storage on hard drive 36 of personal computer 30.

A modem 41 is connected to the personal computer, providing access to a telephone line for communication with a remote site (not shown). Alternatively, an internal modem can be included within processor chassis 32. The modem modulates an analog signal to convey data and other information from personal computer 30 to another computer at a remote site, and demodulates the signal received from a computer at a remote site, producing a digital signal that is input to personal computer 30. It is also contemplated that other types of communication interfaces, such as an integrated services digital network (ISDN) adapter could be used instead of modem 41 to provide for higher speed data communications over the telephone system when personal computer 30 is connected to an on-line network site, e.g., through an Internet access server.

Figure 2:
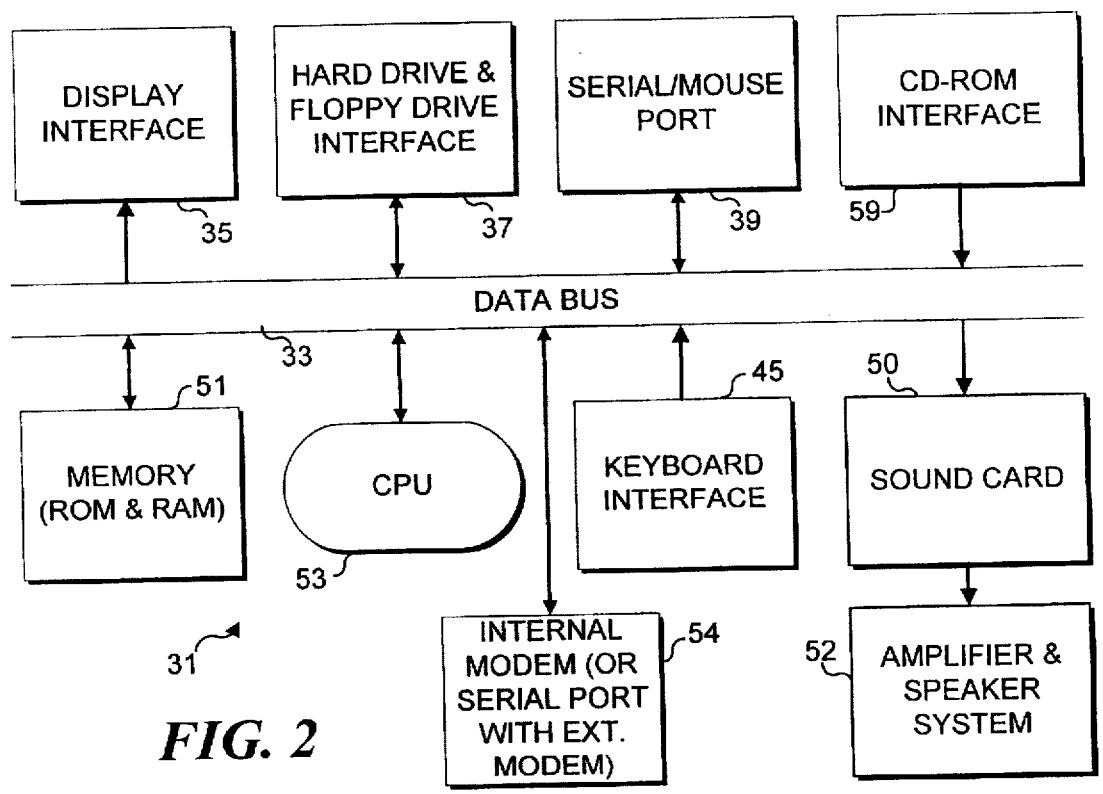
FIG. 2 is a functional block diagram showing internal components of the computer system of FIG. 1.

Although details relating to all of the components mounted on the motherboard or otherwise installed inside processor chassis 32 are not illustrated, FIG. 2 is a block diagram illustrating some of the functional components that are included. The motherboard includes a data bus 33 to which these functional components are electrically connected. A display interface 35, comprising a video card for example, generates signals in response to instructions executed by a CPU 53 that are transmitted to monitor 38 so that graphics and text are displayed on the monitor. A hard drive and floppy drive interface 37 is coupled to data bus 33 to enable bidirectional flow of data and instructions between data bus 33 and floppy drive 34 or hard drive 36. Software programs executed by CPU 53 are typically stored on either hard drive 36, or on a floppy disk (not shown) that is inserted into floppy drive 34. The software program comprising the present invention will likely be distributed either on such a floppy disk, on-line via the modem, or on a CD-ROM disk, and stored on hard drive 36 for execution by CPU 53.

A serial/mouse port 39 (representative of the two serial ports typically provided) is also bidirectionally coupled to data bus 33, enabling signals developed by mouse 40 to be conveyed through the data bus to CPU 53. Alternatively, if a different device such as an external modem is coupled to the serial port, data can be transmitted bidirectionally from the CPU to the modem. A CD-ROM interface 59 connects a CD-ROM drive 47 to data bus 33. The CD-ROM interface may be a small computer systems interface (SCSI) type interface or other interface appropriate for connection to and operation of CD-ROM drive 47.

A keyboard interface 45 receives signals from keyboard 43, coupling the signals to data bus 33 for transmission to CPU 53. Also coupled to data bus 33 is an internal modem 54 (or a second serial port for connection of external modem 41, as shown in FIG. 1). A sound card 50 is optionally connected to data bus 33 to convert digital audio signals used in multimedia applications to analog audio signals that are supplied to an amplifier and speaker system 52.

When a software program is selected by a user to be executed by CPU 53, the machine instructions comprising the program that are stored on a floppy disk or on hard drive 36 are transferred into a memory 51 via data bus 33. Machine instructions comprising the software program are executed by CPU 53, causing it to implement functions determined by the machine instructions. Memory 51 includes both a nonvolatile read only memory (ROM) in which machine instructions used for booting up personal computer 30 are stored, and a random access memory (RAM) in which machine instructions and data are temporarily stored when executing application programs.

The present invention is generally applicable to the compression of three-dimensional geometric data, enabling the resulting compressed data to be stored in less space on the hard drive and to be more quickly and efficiently transmitted to a remote site than the original geometric data. Thus, three-dimensional graphics used on the Internet can be transmitted from a web site page to personal computer 30 in compressed form and rendered on monitor 38 in much less time than would be possible if the geometric data were not compressed by the present invention. Typically, a file containing the compressed data produced using the present invention is less than thirty percent of the size of a file containing the original geometric data.

Three-dimensional objects are normally represented in memory 51 (RAM) by a plurality of connected polygons comprising a mesh. Although polygons having a different shape can be employed, triangles are most frequently used to represent a three-dimensional graphic surface. A three-dimensional object represented by triangles, which is rendered without any smoothing, appears as a multi-faceted surface, where each triangle face comprises a separate facet. To render objects so that the object appears to have a smooth, continuous surface, the average of the normals to each triangle face comprising the smooth portion of the surface is determined. Using this average normal, lighting and shading for the surface are generated based upon Gouraud's algorithm. In certain cases, it is desirable to interrupt a smooth surface at a discontinuity (a point or crease), to more accurately portray an object in the three-dimensional view. Throughout this disclosure and the claims that follow, the term "continuous" as applied to a surface area means that the surface area is smooth, so that a normal to the surface area changes at a uniform rate. The triangles on one side of a line of discontinuity may comprise a smooth surface and those on the other side of the discontinuity may comprise a different smooth surface; lighting and shading considerations for the surfaces on different sides of the discontinuity will be evident in the visual appearance of the three-dimensional view of the object portrayed on the monitor.

In the following disclosure of a preferred embodiment of the present invention, a smooth (continuous) surface that is represented by a plurality of connected triangles sharing a common vertex or corner is characterized at the shared vertex by a "corner normal," which is the average of the normals to the face of the triangles sharing the vertex. The normal to the surface of each triangle is called a "face normal." The corner normal to a continuous surface on one side of a crease or discontinuity will be different than that on the other side.

With reference to FIGS. 3 and 4, six triangles 62a through 62f, which share a common vertex 64, comprise a portion of a mesh 60 that represents a three-dimensional surface. The triangles around common vertex 64 define portions of two smooth surfaces that are separated by a discontinuity or crease represented by the heavier lines along the transitions between triangles 62c and 62d, and triangles 62e and 62f. Triangles 62a, 62b, 62c, and 62f are a portion of one smooth and continuous surface, and triangles 62d and 62e comprise a portion of another different smooth and continuous surface. As shown in FIG. 4, corner normals 66a, 66b, 66c, and 66f (all identical as suggested by vector 66 in FIG. 3) at common vertex 64 are used in determining the lighting and shading for the vertices of triangles 62a, 62b, 62c, and 62f. Similarly, corner normals 66d and 66e' (which are identical, as suggested by vector 66' in FIG. 3) at common vertex 64 are applied in determining the lighting and shading of triangles 62d and 62e.

In FIG. 4, the triangles comprising the portion of mesh 60 are illustrated in an exploded view. In this view, differences between the face normals 68a through 68f and the corner normals that apply to each of the two different groups of triangles on opposite sides of the discontinuity are clearly evident by inspection. Although not shown in FIG. 4, corner normals are associated with all three vertices of each of triangles 62a through 62f, respectively.

In order to define the portion of the surface represented by mesh 60, geometric data are provided that include the coordinates of each vertex of each triangle, the continuity of the surface represented by the triangles, i.e., an indication of where discontinuity or creases like that shown in FIGS. 3 and 4 exist, and information relating to vertex connectivity. The continuity of the surface represented by the mesh can be determined from the corner normals for each triangle. Thus, in a worst case, corner normal information may comprise three corner normals per triangle, or 288 bits per triangle if the corner normals are each represented by three 32-bit floating point numbers.

In the present invention, the amount of data required to define a three-dimensional surface is reduced by making use of the principle that corner normal information can at least be partially inferred from the geometry and connectivity of the mesh. Based on this concept, the amount of information that needs to be transmitted or stored to define a three-dimensional surface can be substantially reduced.

Although different approaches can be used, the present preferred embodiment provides for exclusively encoding the continuity around vertices between the faces of adjacent triangles using vertex rotation continuity (VRC) data. The VRC data comprise one bit for each vertex of a triangle. The VRC bit exclusively encodes the continuity around vertices shared between adjacent triangles. For example, as shown in FIG. 5, triangle 62f includes three VRC bits corresponding to the continuity around each of its vertices relative to adjacent triangles that share those vertices. To more clearly illustrate this concept, FIG. 5 shows an additional triangle 70 that is adjacent to triangle 62f, in addition to triangles 62a and 62e. The VRC bits associated with the three vertices of triangle 62f indicate whether the corner normals of the adjacent triangles that share a common vertex are equal, indicating a continuity of surface between the two adjacent triangles, or unequal, indicating a discontinuity or crease at the transition between the two adjacent triangles sharing the common vertex. Thus, around common vertex 64, which is shared by adjacent triangles 62e and 62f, for a counterclockwise rotation as indicated by a curved arrow 72, for triangle 62f, the VRC equals one, indicating a discontinuity. A curved arrow 74 around a vertex 76, which is shared by adjacent triangles 62f and 62a, represents a transition between the two triangles. For this transition, a triangle 62f has a VRC bit value equal to zero, thereby indicating a continuity between triangles 62f and 62a. Similarly, between triangles 62f and 70, a curved arrow 78 representing the counterclockwise transition between triangles 62f and 70 corresponds to a VRC of zero, since the transition is continuous between triangles 62f and 70 around vertex 80 of triangle 62f. In a similar manner, the VRC bit value for each vertex of each of the other triangles comprising mesh 60 can be determined based on the information shown by a dual map representation 81 of the surface comprising the dash-lines in FIG. 5. This dual map representation defines the topology of the surface, i.e., each dash line segment in the dual map representation crosses a common boundary between a pair of adjacent triangles comprising the object.

The VRC values for the triangles comprising a mesh can be used in encoding information related to the continuity of the surface and corner normals for each of the triangles comprising the mesh that represents the surface by selecting an appropriate optimal dihedral angle in order to make decisions about whether the transition between the two adjacent triangles is continuous or discontinuous. The dihedral angle between two adjacent triangles is the angle formed by extending the face of one triangle over the face of the adjacent triangle, i.e., the angle between the extended plane and the underlying plane of the adjacent triangle.

A premise underlying the present invention is that for dihedral angles that are less than a properly selected optimal dihedral angle, most of the transitions between adjacent triangles will comprise a continuous surface, while for dihedral angles greater than the optimal dihedral angle, most of the transition between the adjacent triangles will be discontinuous. Clearly, this simplifying assumption is not met in every instance. Accordingly, provision must be made for identifying pairs of triangles between which a transition differs from that prediction determined using the optimal dihedral angle. An exception bit is then applied in connection with the transition for those pairs of triangles that do not meet the simplifying assumption and included in exception data that comprises a portion of the compressed data.

Figures 6, 7:
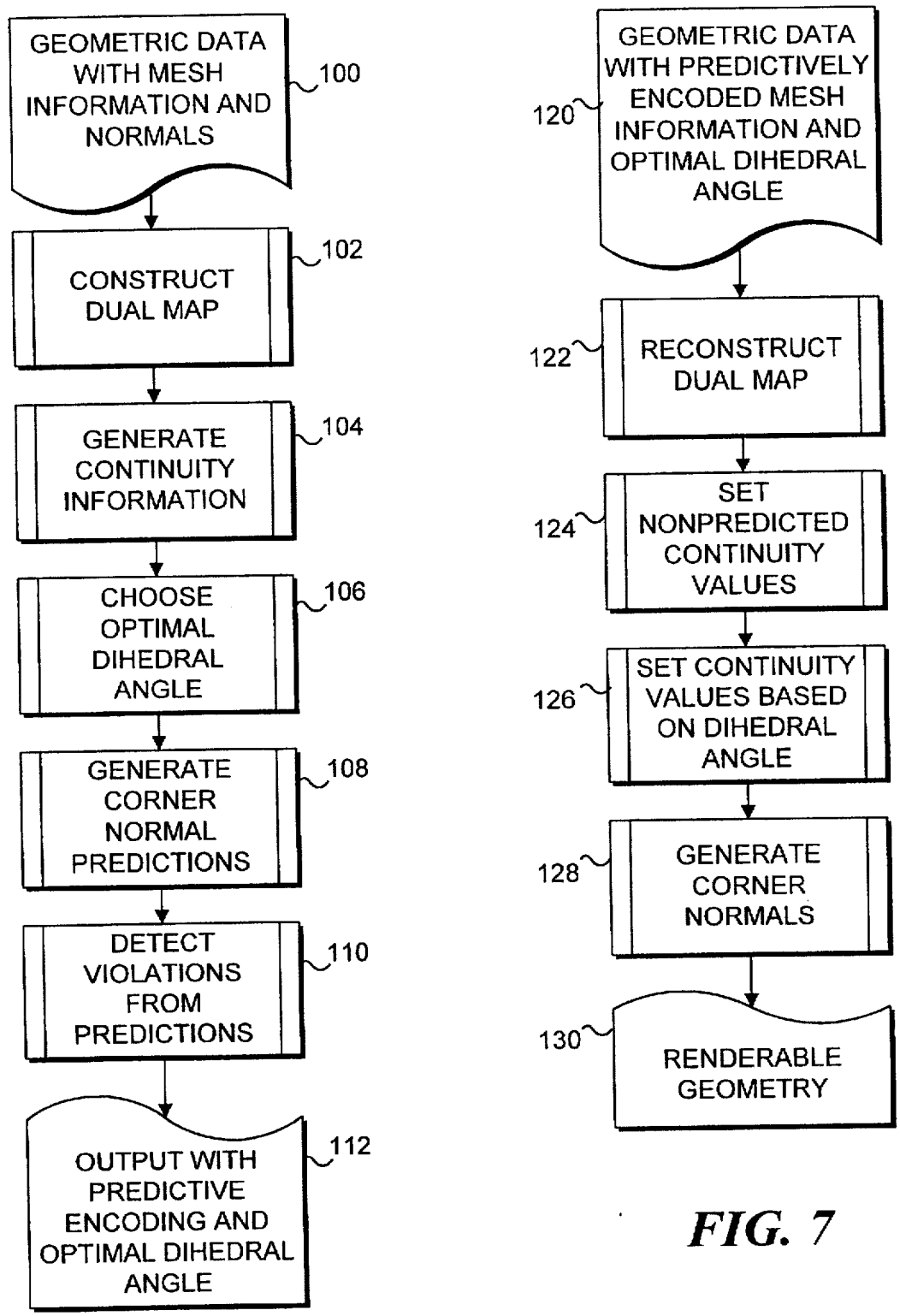
FIG. 6 is a flow chart showing the steps of the method for compressing geometric data that define a three-dimensional surface.
FIG. 7 is a flow chart showing the steps implemented for employing the compressed data to recover data usable to render a three-dimensional surface.

The steps involved in compressing data in accordance with the present invention are disclosed in FIG. 6. In a block 100, geometric data are input that include information about the mesh of triangles and corner normals, and about the continuity between adjacent triangles comprising the mesh. In a block 102, a dual map analogous to that shown in FIG. 4 is constructed for each of the common vertices of triangles comprising the mesh. This step does not equate to actually forming a visual representation as shown in FIG. 4, but rather to simply identifying the corner normal for each triangle surrounding a common vertex so as to identify the faces that are associated with each vertex and indicate the face adjacency for all of the triangles comprising the mesh.

Figure 8:
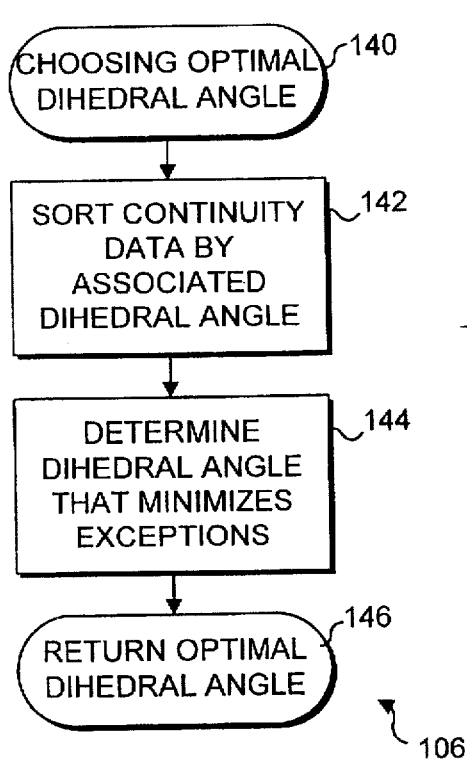
FIG. 8 is a flow chart showing the steps implemented in determining an optimal dihedral angle for use in predicting the continuity of adjacent triangles in a mesh.

In a block 104, continuity information is generated to develop the VRC data in which a bit having a binary value of either zero or one indicates whether adjacent triangles sharing a common vertex have identical corner normals. In this step, the dihedral angles between each pair of adjacent triangles are also determined, using conventional mathematical techniques. In a block 106, the optimal dihedral angle is selected. Details of this step are shown in FIG. 8, as indicated by a block 140. To determine the optimal dihedral angle, the continuity data, i.e., the VRC data for each pair of adjacent triangles, are sorted by the associated dihedral angles in a block 142. In the preferred embodiment, the sort orders the associated VRC data and dihedral angles from the minimum dihedral angle to the maximum dihedral angle.

The purpose of sorting the continuity data by the associated dihedral angle for each pair of adjacent triangles sharing the vertex to which the VRC bit applies is to facilitate selecting the optimal dihedral angle so as to minimize the number of exceptions recorded in the exception data. The optimal dihedral angle is that angle below which most of the transitions between the adjacent triangles comprising the mesh are continuous and above which most of the transitions between adjacent triangles are discontinuous. Thus, the step in a block 144 determines the dihedral angle that will minimize the violations in the prediction of the continuity of the surface, which are based upon the comparison of the dihedral angle between two adjacent triangles and the optimal dihedral angle, for all of the pairs of adjacent triangles comprising the mesh. In a block 146, the optimal dihedral angle is returned for use in the procedure.

In a block 108, the optimal dihedral angle is compared to each of the dihedral angles between adjacent pairs of triangles to generate corner normal predictions. In this step of the preferred embodiment, if the dihedral angle between two adjacent triangles sharing a common vertex is less than or equal to the optimal dihedral angle, the program assumes that the corner normal for the two adjacent triangles are equal, which would yield a predicted VRC bit value of zero. Conversely, if the dihedral angle between the two adjacent triangles is greater than the optimal dihedral angle, the assumption would be that the corner normal for each of the two triangles would be different, indicating a predicted VRC bit value of one.

In a block 110, the corner normal predictions for VRC data are compared to the actual VRC values previously determined in block 104. For any pair of adjacent triangles in which the predicted VRC differs from the actual VRC, an exception bit is indicated in the exception data. In the preferred embodiment, if the predicted corner normal (VRC) for a pair of adjacent triangles sharing a common vertex is correct, a binary zero bit is included in the exception data, and if incorrect, a binary one bit is included. Other formats could alternatively be used for indicating and storing the exception data.

Finally, in a block 112, compressed data are output. The compressed data include the optimal dihedral angle, vertices of the triangles, faces, and the exception data. To further minimize the amount of data required to define the three-dimensional surface, the exception data are run-length encoded (RLE) or are encoded to only indicate the positions in the data of each exception datum. This latter approach to encoding the exception data recognizes that in the exception data generated for the pairs of adjacent triangles comprising a mesh, it is possible to indicate the occurrence of a violation of the predicted continuity of the surface (i.e., an exception bit) in relation to the position at which the violation occurred in a sequential list of pairs of adjacent triangles. For example, using the encoding method, the data would indicate that at the nth position in the exception data, an exception bit was set to note that the prediction was inaccurate for that corresponding pair of adjacent triangles in the sequence of pairs of adjacent triangles. Instead of storing exception data that includes a majority of zeroes (indicating that the prediction was correct) with ones interspersed at intervals to indicate where the prediction was incorrect, this encoding technique just described will indicate only the point(s) (if any) in the stream of the exception data for the pair(s) of triangles at which the prediction failed.

It is also contemplated that a header for the compressed data will include an Ignore$_{13}$Exception$_{13}$Data bit that can be set to one to indicate that no exceptions occurred, thereby essentially eliminating the exception data from the compressed data, if all predictions were accurate. If the value for this bit in the header is not set, a program using the compressed data to render the three-dimensional surface will be alerted to consider the exception data in determining the continuity of the surface.

FIG. 7 illustrates the steps involved in using the compressed data to render a display of the three-dimensional surface of an object. In a block 120, the geometric data that have been compressed and the threshold optimal dihedral angle are input for processing. In a block 122, the dual map of the triangles comprising the mesh is reconstructed, generally as was done in connection with block 102 in FIG. 6. The dual map of the triangles identifies the faces of the triangles that are associated with each vertex and the adjacency of the triangles comprising the mesh.

A block 124 provides for setting nonpredicted continuity values in response to the exception data. In this step, the transition between adjacent pairs of triangles in which comparison of the dihedral angle between the adjacent triangles and the optimal dihedral angle would lead to an incorrect continuity are identified by reference to the exception data so that the transition can be set contrary to the predicted transition. In a block 126, the continuity values between adjacent pairs of triangles are set based upon the comparison of the dihedral angle between the adjacent triangles and the optimal dihedral angle, for all remaining pairs of adjacent triangles that were not in violation of the prediction, as noted during the step of block 124.

In a block 128, the corner normals are generated for each of the vertices of the triangles comprising the mesh. For those triangles sharing a common vertex and having a continuous transition, the face normals for the triangles are averaged to generate the corner normal that will be used for the smooth or continuous surface represented by such triangles. Finally, in a block 130, the program produces a renderable geometry representing the three-dimensional surface object on the display of a monitor. Typically, in this step, the corner normal information is used in connection with the Gouraud algorithm to determine lighting and shading considerations of the three-dimensional surface, taking into consideration continuity and discontinuity of the triangles comprising the mesh.

Figure 9:
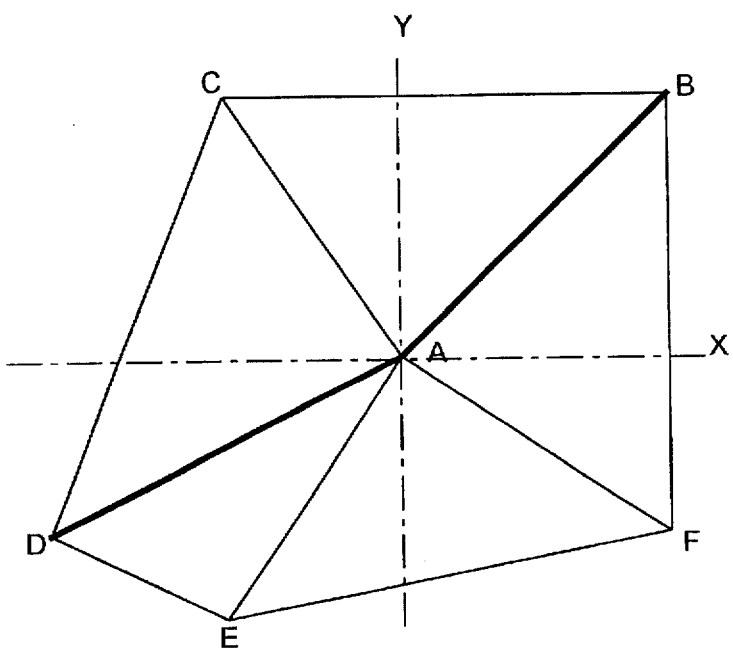
FIG. 9 is a plan view of a portion of a mesh of triangles representing a three-dimensional surface that is used in an example illustrating how the present invention is applied in compressing geometric data.
Figure 10:
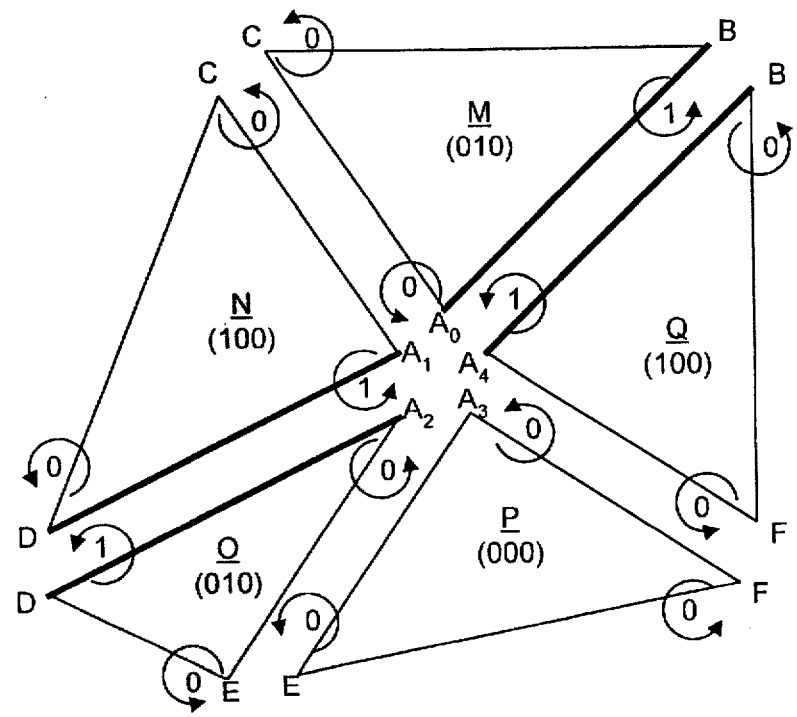
FIG. 10 is a dual map view of the portion of the mesh shown in FIG. 9, showing how the VRC data are determined.

FIGS. 9 and 10 represent a simple example that may help to clarify how the present invention is applied to compress geometric data representing a three-dimensional surface. To simplify the example, only data relative to a common vertex A are presented for a portion of a mesh that represents a three-dimensional surface. In FIG. 9, XY axes having an origin at a common vertex A that is shared by all of the triangles comprising the portion of the mesh illustrated are shown for reference purposes. The triangles sharing vertex A comprise portions of two continuous surfaces on each side of a crease or discontinuous transition between the surfaces represented by the darker line extending between vertices D, A, and B. Thus, triangles ABC and ACD comprise a portion of a first continuous surface and triangles AFB, AEF, and ADE comprise a portion of a second and different continuous surface separated from the first by the line of discontinuity extending through vertices D, A, and B.

The geometric data defining the portion of the mesh represented by the triangles shown in FIG. 9 are as follows:

| VERTICES | TRIANGLES | PERT. CORNER NORMALS | | | FACE NORMALS | | |
|---|---|---|---|---|---|---|---|
| A (0, 0, 0) | ABC | $A_0$: −0.1626 | 0.2128 | −0.9635 | 0.0000 | 0.3068 | −0.9197 |
| B (3, 3, 1) | ACD | $A_1$: −0.1626 | 0.2128 | −0.9635 | −0.3145 | 0.1048 | −0.9435 |
| C (−2, 3, 1) | ADE | $A_2$: 0.1149 | −0.1675 | −0.9792 | −0.0976 | −0.1952 | −0.9759 |
| D (−4, 3, 1) | AEF | $A_3$: 0.1149 | −0.1675 | −0.9792 | 0.1185 | −0.2962 | −0.9478 |
| E (−2, −4, 1) | AFB | $A_4$: 0.1149 | −0.1675 | −0.9792 | 0.3162 | 0.0000 | −0.9487 |
| F (3, −2, 1) | | | | | | | |

In the preceding geometric data, a line separates the data for the triangles comprising the first and the second continuous surfaces. The corner normals (unit vectors given in terms of their three orthogonal components) for each of the vertices in the portion of the mesh represented are equal to the mean of the face normals (also unit vectors) for the triangles comprising a continuous surface and sharing a common vertex A. Although the data are not shown, the same type of data are determined for the other vertices of the triangles that share a common vertex.

To simplify the nomenclature, the following equivalencies are used in connection with the triangles shown in FIG. 10.

Triangle ABC≡Triangle M
Triangle ACD≡Triangle N
Triangle ADE≡Triangle O
Triangle AEF≡Triangle P
Triangle AFB≡Triangle Q In FIG. 10, the VRC bits corresponding to each of the vertices of triangles M, N, O, P, and Q are identified as follows:

Triangle M: 010
Triangle N: 100
Triangle O: 010
Triangle P: 000
Triangle Q: 100

In the preceding VRC data, the VRC bits for each of the common vertices shared by adjacent triangles are set to a zero if the transition between adjacent triangles taken in a counterclockwise direction around the common vertex is continuous, and is set to a one if the transition is discontinuous. Accordingly, around common vertex A, the counterclockwise transition between triangles M and N is continuous and the VRC bit is zero. In contrast, the counterclockwise transition between triangles N and O, taken in a counterclockwise direction around vertex A, is discontinuous, and the VRC bit is set equal to a one.

The dihedral angles between adjacent triangles that share common vertex A and the corresponding VRC bit indicating the continuity between the adjacent triangles is as follows:

| DIHEDRAL ANGLES | VRC BIT |
|---|---|
| M–N: 21.85° | 0 |
| N–O: 21.42° | 1 |
| O–P: 13.79° | 0 |
| P–Q: 20.51° | 0 |
| Q–M: 25.58 | 1 |

Having determined the dihedral angles and the corresponding VRC bit, the next step of the procedure is to sort these data by the dihedral angle, from smallest to largest, yielding the following results:

| SORTED DIHEDRAL ANGLES | VRC BIT |
|---|---|
| 13.79° | 0 |
| 20.51° | 0 |
| 21.42° | 1 |
| 21.85° | 0 |
| 25.84° | 1 |

Next, the optimal dihedral angle is determined based upon the sorted data shown above. In selecting the optimal dihedral angle, the goal is to minimize the number of occurrences of a discontinuous transition between adjacent triangles having a dihedral angle less than or equal to the selected optimal dihedral angle, and the number of pairs of triangles that are continuous but have a dihedral angle greater than the selected optimal dihedral angle. In this simplistic example, the optimal dihedral angle can be selected by inspection, as any angle between 20.51° and 21.42°. Although any angle in this range could be selected, in the preferred embodiment, the optimal dihedral angle is set equal to the average of the two dihedral angles in the sorted data between which the optimal dihedral angle is known to lie. Thus, for the simple example presented above, the optimal dihedral angle is 20.96°.

Having determined the optimal dihedral angle, the next step is to determine the exception data. The exception data indicate whether the corner normal is accurately predicted by the comparison of the dihedral angle and the optimal dihedral angle, i.e., whether the continuity or discontinuity between adjacent triangles is accurately predicted. Conversely, if the prediction is incorrect the exception data include a one. Accordingly, the following exception data applies for the simple example presented above:

| TRIANGLES | NONPREDICTED VRC BITS |
|---|---|
| M | 0 0 0 |
| N | 0 1 0 |
| O | 0 0 0 |
| P | 0 0 0 |
| Q | 0 0 0 |

In the above example, only a single binary one appears in the exception data, all other bits of the exception data being equal to zero. As noted above, it is contemplated that in some cases all bits of the exception data may be equal to zero. In this case, an $Ignore_{13}Exception_{13}Data$ bit included in the header for the compressed data will indicate that none of the predicted transitions between adjacent triangles is incorrect, eliminating any need for including the exception data in the compressed data stream. Where any binary ones appear in the exception data to indicate transitions between adjacent pairs of triangles that are incorrectly predicted, the total amount of the exception data can be substantially reduced using run-length encoding to indicate only the position in the exception data at which the binary ones occur. Other types of encoding techniques can alternatively be used to minimize the amount of exception data required to properly define the continuity of triangles comprising the mesh, in the compressed data that defines the three-dimensional surface.

Using the compressed data, the three-dimensional surface can be recovered, for example, in order to display the surface on the monitor. Since the compressed data includes the vertices for all triangles comprising the mesh and identifies the triangle faces, it is possible to reconstruct the three-dimensional surface, correctly indicating the triangles comprising continuous surfaces and correctly noting the transition between surfaces that are discontinuous, at a crease in the surface or at a point. Since it is not necessary to provide the pertinent corner normals in the compressed data, a substantial reduction in the quantity of data required to define the three-dimensional surface is achieved by the present invention.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for compressing geometric data that represent a surface as a mesh of connected polygons, comprising the steps of:
    (a) loading the geometric data into a computer memory for processing, said geometric data indicating the polygons connected to form the mesh, coordinates for vertices of each polygon, and continuity data specifying whether transitions between pairs of adjacent polygons are continuous or discontinuous;
    (b) determining a dihedral angle between each pair of adjacent polygons and associating the dihedral angle for each pair of adjacent polygons with the continuity data for said pair of adjacent polygons;
    (c) selecting an optimal dihedral angle for use in predicting whether the transition between each pair of adjacent polygons is continuous or discontinuous, said optimal dihedral angle being selected so as to minimize exceptions;
    (d) using the optimal dihedral angle, generating predicted corner normals for each pair of adjacent polygons that indicate whether transitions between the pair of adjacent polygons should be continuous or discontinuous;
    (e) comparing the predicted corner normals for each pair of adjacent polygons to the continuity data for the pair of adjacent polygons to determine exception data that indicate the predicted corner normal for the pair of adjacent polygons is incorrect;
    (f) producing compressed data that include the polygons, the vertices, the optimal dihedral angle, and the exception data; and
    (g) transmitting or storing the compressed data.

2. A method for compressing geometric data that represent a surface as a plurality of connected polygons arranged in a mesh, said geometric data including coordinates for vertices of each polygon in the mesh, an index of the polygons, and normals to corners of the polygons, comprising the steps of:
    (a) loading said geometric data into a computer memory to enable processing of the geometric data to determine vertex rotation continuity data for the vertices of each polygon, said vertex rotation continuity data indicating whether adjacent polygons of the mesh that share a common vertex are continuous;
    (b) determining a dihedral angle between each pair of adjacent polygons;
    (c) choosing an optimal dihedral angle to predict whether a surface transition between each pair of adjacent polygons is continuous or discontinuous;
    (d) generating corner normal predictions that predict surface continuity as a function of the dihedral angle between each pair of adjacent polygons and the optimal dihedral angle;
    (e) determining exception data that indicate polygon corners for which the corner normal predictions are incorrect; and
    (f) producing compressed data that include the vertices of the polygons comprising the mesh, the optimal dihedral angle, and the exception data, where said compressed data define the surface, but require less storage than the geometric data.

3. The method of claim 2, wherein the step of determining vertex rotation continuity data comprises the step of determining if the normals to the corners of the polygons comprising each pair of adjacent polygons in the mesh are identical, indicating a surface continuity between the pair of adjacent polygons, or not identical, indicating a surface discontinuity between the pair of adjacent polygons.

4. The method of claim 3, wherein the vertex rotation continuity data comprise a binary bit for each of the corners of the polygons comprising the pairs of adjacent polygons, said binary bit of vertex rotation continuity data for a corner of a polygon being associated with the dihedral angle between the pair of adjacent polygons that share a common vertex at said corner.

5. The method of claim 4, wherein the step of choosing the optimal dihedral angle comprises the steps of:

(a) sorting the vertex rotation continuity data by the associated dihedral angles between each of the pairs of adjacent polygons; and (b) selecting the optimal dihedral angle so as to minimize the number of corner normal predictions that are incorrect.

6. The method of claim 2, wherein the step of determining the exception data from corner normal predictions comprises the steps of:

(a) comparing the corner normal predictions to actual corner normals; and (b) if the corner normal prediction for a corner is not identical to the actual corner normal, indicating an exception in the exception data.

7. The method of claim 6, further comprising the step of encoding the exception data to further reduce the size of the compressed data.

8. The method of claim 7, wherein the step of encoding comprises the step of indicating a position in a stream of the compressed data at which a corner normal prediction is not identical to an actual corner normal.

9. A system for compressing geometric data that represent a surface as a plurality of connected polygons arranged in a mesh, said geometric data including coordinates for vertices of each polygon in the mesh, an index of the polygons, normals to corners of the polygons, said system comprising:

(a) a display for displaying the geometric data as a rendered surface;

(b) a memory for storing machine instructions comprising a software program; and (c) a central processing unit for executing the machine instructions stored in the memory, said machine instructions effecting a plurality of functions that compress the geometric data to produce compressed data for use in rendering the surface on the display, said plurality of functions implemented by the central processing unit in accord with said machine instructions including:

(i) processing the geometric data to determine which adjacent polygons of the mesh that share a common vertex are continuous and which adjacent polygons of the mesh that share a common vertex are discontinuous, and storing continuity data indicative of continuity of surface transitions between said adjacent polygons;

(ii) determining dihedral angles between each of the adjacent polygons;

(iii) determining an optimal dihedral angle to predict whether a surface transition between adjacent polygons is continuous or discontinuous;

(iv) generating corner normal predictions that indicate the continuity of the surface transitions between adjacent polygons as a function of the dihedral angle between each of the adjacent polygons and the optimal dihedral angle;

(v) determining exception data that indicate polygon corners for which the corner normal predictions are incorrect; and (vi) producing compressed data that include the vertices of the polygons comprising the mesh, the optimal dihedral angle, and the exception data, where said compressed data define the surface.

10. The system of claim 9, wherein the continuity data comprise vertex rotation continuity data in which a value is associated with each vertex of the polygons indicating whether adjacent polygons of the mesh that share a common vertex are continuous.

11. The system of claim 9, wherein the machine instructions executed by the central processing unit cause it to determine the optimal dihedral angle by associating the vertex rotation continuity data for each vertex with the dihedral angle between adjacent polygons that share said vertex, and then selecting the optimal dihedral angle so as to minimize errors in predicting whether the transition between the adjacent polygons that share a vertex is continuous or discontinuous.

12. The system of claim 11, wherein the machine instructions executed by the central processing unit further cause it to sort the vertex rotation data by the dihedral angle associated therewith, to facilitate selecting the optimal dihedral angle.

13. The system of claim 9, wherein the machine instructions executed by the central processing unit cause it to store the compressed data in the memory for subsequent use.

14. The system of claim 9, wherein the machine instructions executed by the central processing unit cause it to generate a corner normal prediction that indicates the surface transition between two adjacent polygons is continuous if the dihedral angle between said two adjacent polygons is less than the optimal dihedral angle, and which indicates the surface transition between said two adjacent polygons is discontinuous if the dihedral angle between said two adjacent polygons is greater than the optimal dihedral angle.

15. The system of claim 9, wherein the machine instructions executed by the central processing unit cause it to transmit the compressed data over a network to a different location for rendering the surface using the compressed data at the remote location.

16. The system of claim 15, wherein the machine instructions executed by the central processing unit further cause it to encode the exception data comprising the compressed data to further reduce the size of the compressed data.

17. The system of claim 16, wherein the central processing unit encodes the exception data by indication a position in a stream of the compressed data at which an error occurred in the prediction of the transition between the adjacent polygons.

18. An article of manufacture for use in controlling a processor of a computer, comprising:

(a) a memory medium for storing machine instructions used to control a computer, said machine instructions, when executed by the processor, causing it to compress geometric data that represent a surface as a plurality of connected polygons arranged in a mesh, said geometric data including coordinates for vertices of each polygon in the mesh, an index of the polygons, and normals to corners of the polygons; and (b) said machine instructions stored by the memory medium, when executed by the processor, causing the processor to compress the geometric data by:

(i) determining whether a surface transition between adjacent polygons of the mesh that share a common vertex is continuous or discontinuous, and storing continuity data indicative of the continuity of surface transitions between said adjacent polygons;

(ii) determining dihedral angles between each of the adjacent polygons;

(iii) determining an optimal dihedral angle for use in predicting whether a surface transition between the adjacent polygons is continuous or discontinuous;

(iv) generating corner normal predictions that indicate the continuity of the surface transitions between the adjacent polygons as a function of the dihedral angle between each of the adjacent polygons and the optimal dihedral angle;

(v) determining exception data that indicate polygon corners for which the corner normal predictions are incorrect; and (vi) producing compressed data that include the vertices of the polygons comprising the mesh, the optimal dihedral angle, and the exception data, where said compressed data define the surface.

19. The article of manufacture of claim 18, wherein the continuity data comprise vertex rotation continuity data in which a value is associated with each vertex of the polygons indicating whether the adjacent polygons of the mesh that share a common vertex are continuous.

20. The article of manufacture of claim 18, wherein the machine instructions stored on the memory medium provide for determining the optimal dihedral angle by associating the vertex rotation continuity data for each vertex with the dihedral angle between adjacent polygons that share said vertex, and then selecting the optimal dihedral angle so as to minimize errors in predicting whether the transition between the adjacent polygons that share a vertex is continuous or discontinuous.

21. The article of manufacture of claim 20, wherein the machine instructions stored on the memory medium provide for sorting the vertex rotation data by the dihedral angle associated therewith, to facilitate selecting the optimal dihedral angle.

22. The article of manufacture of claim 18, wherein the machine instructions stored on the memory medium provide for storing the compressed data in the memory for subsequent use.

23. The article of manufacture of claim 18, wherein the machine instructions stored on the memory medium provide for generating a corner normal prediction that indicates the surface transition between two adjacent polygons is continuous if the dihedral angle between said two adjacent polygons is less than the optimal dihedral angle, and which indicates the surface transition between said two adjacent polygons is discontinuous if the dihedral angle between said two adjacent polygons is greater than the optimal dihedral angle.

24. The article of manufacture of claim 18, wherein the machine instructions stored on the memory medium provide for transmitting the compressed data to a different location for rendering the surface by using the compressed data at the remote location.

25. The article of manufacture of claim 18, wherein the machine instructions stored on the memory medium provide for encoding the exception data comprising the compressed data to further reduce the size of the compressed data.

26. The article of manufacture of claim 25, wherein the machine instructions provide for indicating a point in a stream of the compressed data at which an error in the prediction of the corner normal occurred.

* * * * *

UNITED STATES PATENT AND TRADEMARK OFFICE
CERTIFICATE OF CORRECTION

Page 1 of 2

PATENT NO. : 5,736,987
DATED : April 7, 1998
INVENTOR(S) : Drucker et al.

It is certified that error appears in the above-indentified patent and that said Letters Patent is hereby corrected as shown below:

| | |
|---|---|
| Section [56], References Cited, Other Publications, 1st Reference | "Datasets"." should read --Datasets",-- |
| Section [56], References Cited, Other Publications, 2nd Reference | "Durkin, John," should read --Danskin, John,-- |
| Section [56], References Cited, Other Publications, 3rd Reference | Insert 3rd Reference: --Deering, Michael, "Geometry Compression," Published SIGGRAPH '95, August 1995, 8 pages.-- |
| Column 8, line 50 | "Ignore$_{13}$Exception$_{13}$Data" should read --Ignore_Exception_Data-- |
| Column 10, line 4 | "Triangle M" should read --Triangle $\underline{M}$-- |
| Column 10, line 5 | "Triangle N" should read --Triangle $\underline{N}$-- |
| Column 10, line 6 | "Triangle O" should read --Triangle $\underline{O}$-- |
| Column 10, line 7 | "Triangle P" should read --Triangle $\underline{P}$-- |
| Column 10, line 8 | "Triangle Q" should read --Triangle $\underline{Q}$-- |

UNITED STATES PATENT AND TRADEMARK OFFICE
CERTIFICATE OF CORRECTION

PATENT NO. : 5,736,987
DATED : April 7, 1998
INVENTOR(S) : Drucker et al.

It is certified that error appears in the above-indentified patent and that said Letters Patent is hereby corrected as shown below:

Location

| | |
|---|---|
| Column 10, line 10 | "M, N, O, P, and Q" should read -- M, N, O, P, and Q-- |
| Column 10, line 12 | "M" should read --M-- |
| Column 10, line 13 | "N" should read --N-- |
| Column 10, line 14 | "O" should read --O-- |
| Column 10, line 15 | "P" should read --P-- |
| Column 10, line 16 | "Q" should read --Q-- |
| Column 10, line 23 | "M and N" should read --M and N-- |
| Column 10, line 25 | "N and O" should read --N and O-- |
| Column 11, line 38 | "Ignore$_{13}$Exception$_{13}$Data" should read --Ignore_Exception_Data-- |

Signed and Sealed this

Thirtieth Day of June, 1998

Attest:

BRUCE LEHMAN

Attesting Officer        *Commissioner of Patents and Trademarks*